United States Patent
Bindal et al.

(10) Patent No.: US 11,457,024 B2
(45) Date of Patent: Sep. 27, 2022

(54) SYSTEMS AND METHODS FOR MONITORING SECURITY OF AN ORGANIZATION BASED ON A NORMALIZED RISK SCORE

(71) Applicant: Citrix Systems, Inc., Fort Lauderdale, FL (US)

(72) Inventors: Rishabh Bindal, San Jose, CA (US); Nastaran Baradaran, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 664 days.

(21) Appl. No.: 16/283,260

(22) Filed: Feb. 22, 2019

(65) Prior Publication Data

US 2020/0045064 A1 Feb. 6, 2020

Related U.S. Application Data

(60) Provisional application No. 62/714,377, filed on Aug. 3, 2018.

(51) Int. Cl.
*H04L 9/00* (2022.01)
*H04L 9/40* (2022.01)
*G06F 17/18* (2006.01)

(52) U.S. Cl.
CPC .......... *H04L 63/1416* (2013.01); *G06F 17/18* (2013.01); *H04L 63/1433* (2013.01); *H04L 63/1441* (2013.01)

(58) Field of Classification Search
CPC ............. H04L 63/1416; H04L 63/1433; H04L 63/1441; G06F 17/18
USPC .......................................................... 726/22
See application file for complete search history.

(56) References Cited

U.S. PATENT DOCUMENTS

| | | | |
|---|---|---|---|
| 11,042,880 B1 * | 6/2021 | Hazan | G06Q 20/4016 |
| 2014/0046863 A1 * | 2/2014 | Gifford | G06Q 10/10 |
| | | | 705/325 |
| 2016/0127536 A1 * | 5/2016 | Jayapalan | H04M 3/5133 |
| | | | 379/265.02 |
| 2019/0036937 A1 * | 1/2019 | Cullison | H04L 63/20 |

* cited by examiner

*Primary Examiner* — Christopher J Brown
(74) *Attorney, Agent, or Firm* — Foley & Lardner LLP

(57) ABSTRACT

Embodiments described include a computing device for generating risk scores of network entities. The computing device can include one or more processors configured to detect a plurality of risk indicators. Each of the risk indicators identify one of a plurality of activities of a network entity of an organization. The network entity includes a device, an application or a user in the organization's network. The one or more processors can generate a risk score of the network entity, by combining a risk value, an amplification factor and a dampening factor of each of the plurality of risk indicators, and adding an adjustment value for the plurality of risk indicators. The one or more processors can determine, using the generated risk score, a normalized risk score of the network entity. The one or more processors can initiate an action according to the normalized risk score.

20 Claims, 4 Drawing Sheets

SYSTEMS AND METHODS FOR MONITORING SECURITY OF AN ORGANIZATION BASED ON A NORMALIZED RISK SCORE

CROSS-REFERENCE TO RELATED APPLICATION

The present application claims priority to U.S. Provisional Patent Application No. 62/714,377, filed on Aug. 3, 2018, which is incorporated by reference herein in its entirety.

FIELD OF THE DISCLOSURE

The present application generally relates to security management, including but not limited to systems and methods for monitoring security of an organization based on a normalized risk score.

BACKGROUND

As the workforce of an enterprise becomes more mobile and work under various conditions, an individual can use one or more client devices, including personal devices, to access network resources such as web applications. Due to differences between the client devices and the manner in which network resources can be accessed, there are significant challenges to the enterprise in managing access to network resources and monitoring for potential misuse of resources.

SUMMARY

The present disclosure is directed towards systems and methods for monitoring risk or security of an organization. The risk or security of an organization can be based on a normalized risk score determined for each of a plurality of entities of the organization. A risk score is generally referred to as a level of risk imposed by a network entity to an organization. Such a network entity can include a device, an application, and/or a user in the organization's network. The disclosed systems and methods can measure risk in the context of user and entity behavior analytics (UEBA). In some embodiments, the disclosed systems and methods can periodically generate normalized risk scores for a network entity based on various behaviors of the network entity such as, for example, to what extent the network entity's behavior(s) deviate from the network entity's normal patterns of behavior or activity. In some embodiments, the disclosed systems and methods can generate a normalized risk score (or profile-adjusted risk score) for a network entity by collecting one or more measures (e.g., scores or risk values) of the network entity's accumulating, or accumulated risky behavior(s), amplifying and/or dampening the one or more measures based on frequency and/or timeline of the risky behavior(s), and normalizing the one or more measures.

In one aspect, this disclosure is directed to a computing device that includes a memory, and one or more processors operatively coupled to the memory. The one or more processors can detect a plurality of risk indicators. Each of the risk indicators identify one of a plurality of activities of a network entity of an organization. The network entity includes a device, an application or a user in the organization's network. The one or more processors can generate a risk score of the network entity, by combining a risk value, an amplification factor and a dampening factor of each of the plurality of risk indicators, and adding an adjustment value for the plurality of risk indicators. The one or more processors can determine, using the generated risk score, a normalized risk score of the network entity which indicates potential risk from the network entity to the organization. The one or more processors can initiate an action according to the normalized risk score, to protect the organization from the potential risk indicated by the normalized risk score of the network entity.

In some embodiments, the one or more processors can receive risk scores of the network entity over a training period, each of the risk scores having an estimated frequency over the training period. The one or more processors can determine a probability of each of the risk scores over the training period according to the estimated frequency of each of the risk scores over the training period.

In some embodiments, the one or more processors can identify a probability P for the generated risk score, according to the probabilities determined over the training period. The one or more processors can determine the normalized risk score as $(1-P) \times 100$. In some embodiments, the adjustment value includes an amplification value for the plurality of risk indicators, and/or a dampening value for the plurality of risk indicators.

In some embodiments, the one or more processors can determine whether the generated risk score is greater or less than a pre-defined threshold. The one or more processors can, based on the determination of whether the generated risk score is greater or less than a pre-defined threshold, adjust the generated risk score according to the pre-defined threshold to determine the normalized risk score of the network entity. In some embodiments, the one or more processors can proportionally adjust at least one of the risk value, the amplification factor and/or the dampening factor of each of the plurality of risk indicators, and/or the adjustment value for the plurality of risk indicators, according to the pre-defined threshold.

In some embodiments, the one or more processors can determine the amplification factor of a first risk indicator of the plurality of risk indicators according to a frequency of the first risk indicator. The one or more processors can determine the dampening factor of a second risk indicator of the plurality of risk indicators for a time period according to a probability of the second risk indicator in a previous time period.

In another aspect, this disclosure is directed to a method. The method can include detecting, by a server, a plurality of risk indicators. Each of the risk indicators can identify one of a plurality of activities of a network entity of an organization. The network entity can include a device, an application or a user in the organization's network. The method can include generating, by the server, a risk score of the network entity, by combining a risk value, an amplification factor and/or a dampening factor of each of the plurality of risk indicators, and/or adding an adjustment value for the plurality of risk indicators. The method can include determining, by the server using the generated risk score, a normalized risk score of the network entity which indicates potential risk from the network entity to the organization. The method can include initiating, by the server, an action according to the normalized risk score to protect the organization from the potential risk indicated by the normalized risk score of the network entity.

In some embodiments, the method can include receiving, by the server, risk scores of the network entity over a training period, each of the risk scores having an estimated frequency over the training period. The method can include determining, by the server, a probability of each of the risk scores over the training period according to the estimated frequency of each of the risk scores over the training period.

In some embodiments, the method can include identifying, by the server, a probability P for the generated risk score, according to the probabilities determined over the training period. The method can include determining, by the server, the profile-adjusted risk score as (1−P)×100. In some embodiments, the adjustment value includes an amplification value for the plurality of risk indicators, and/or a dampening value for the plurality of risk indicators.

In some embodiments, the method can include determining whether the generated risk score is greater or less than a pre-defined threshold. The method can include adjusting the generated risk score according to the pre-defined threshold to determine the normalized risk score of the network entity based on the determination of whether the generated risk score is greater or less than a pre-defined threshold. In some embodiments, the method can include proportionally adjusting at least one of the risk value, the amplification factor or the dampening factor of each of the plurality of risk indicators, and/or the adjustment value for the plurality of risk indicators, according to the pre-defined threshold.

In yet another aspect, this disclosure is directed to a non-transitory computer readable medium storing program instructions. The program instructions can cause one or more processors to detect a plurality of risk indicators. Each of the risk indicators identify one of a plurality of activities of a network entity of an organization. The network entity can include a device, an application or a user in the organization's network. The program instructions can cause one or more processors to generate a risk score of the network entity, by combining a risk value, an amplification factor and/or a dampening factor of each of the plurality of risk indicators, and/or adding an adjustment value for the plurality of risk indicators. The program instructions can cause one or more processors to determine, using the generated risk score, a normalized risk score of the network entity which indicates potential risk from the network entity to the organization. The program instructions can cause one or more processors to initiate an action according to the normalized risk score, to protect the organization from the potential risk indicated by the normalized risk score of the network entity.

In some embodiments, the program instructions can cause one or more processors to receive risk scores of the network entity over a training period, each of the risk scores having an estimated frequency over the training period. The program instructions can cause one or more processors to determine a probability of each of the risk scores over the training period according to the estimated frequency of each of the risk scores over the training period.

In some embodiments, the program instructions can cause one or more processors to identify a probability P for the generated risk score, according to the probabilities determined over the training period. The program instructions can cause one or more processors to determine the normalized risk score as (1−P)×100. In some embodiments, the adjustment value includes an amplification value for the plurality of risk indicators, and a dampening value for the plurality of risk indicators.

In some embodiments, the program instructions can cause one or more processors to determine whether the generated risk score is greater or less than a pre-defined threshold. The program instructions can cause one or more processors to adjust the generated risk score according to the pre-defined threshold to determine the normalized risk score of the network entity based on the determination of whether the generated risk score is greater or less than a pre-defined threshold.

In some embodiments, the program instructions can cause one or more processors to proportionally adjust at least one of the risk value, the amplification factor or the dampening factor of each of the plurality of risk indicators, and/or the adjustment value for the plurality of risk indicators, according to the pre-defined threshold.

In some embodiments, the program instructions can cause one or more processors to determine the amplification factor of a first risk indicator of the plurality of risk indicators according to a frequency of the first risk indicator. The program instructions can cause one or more processors to determine the dampening factor of a second risk indicator of the plurality of risk indicators for a time period, according to a probability of the second risk indicator in a previous time period.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
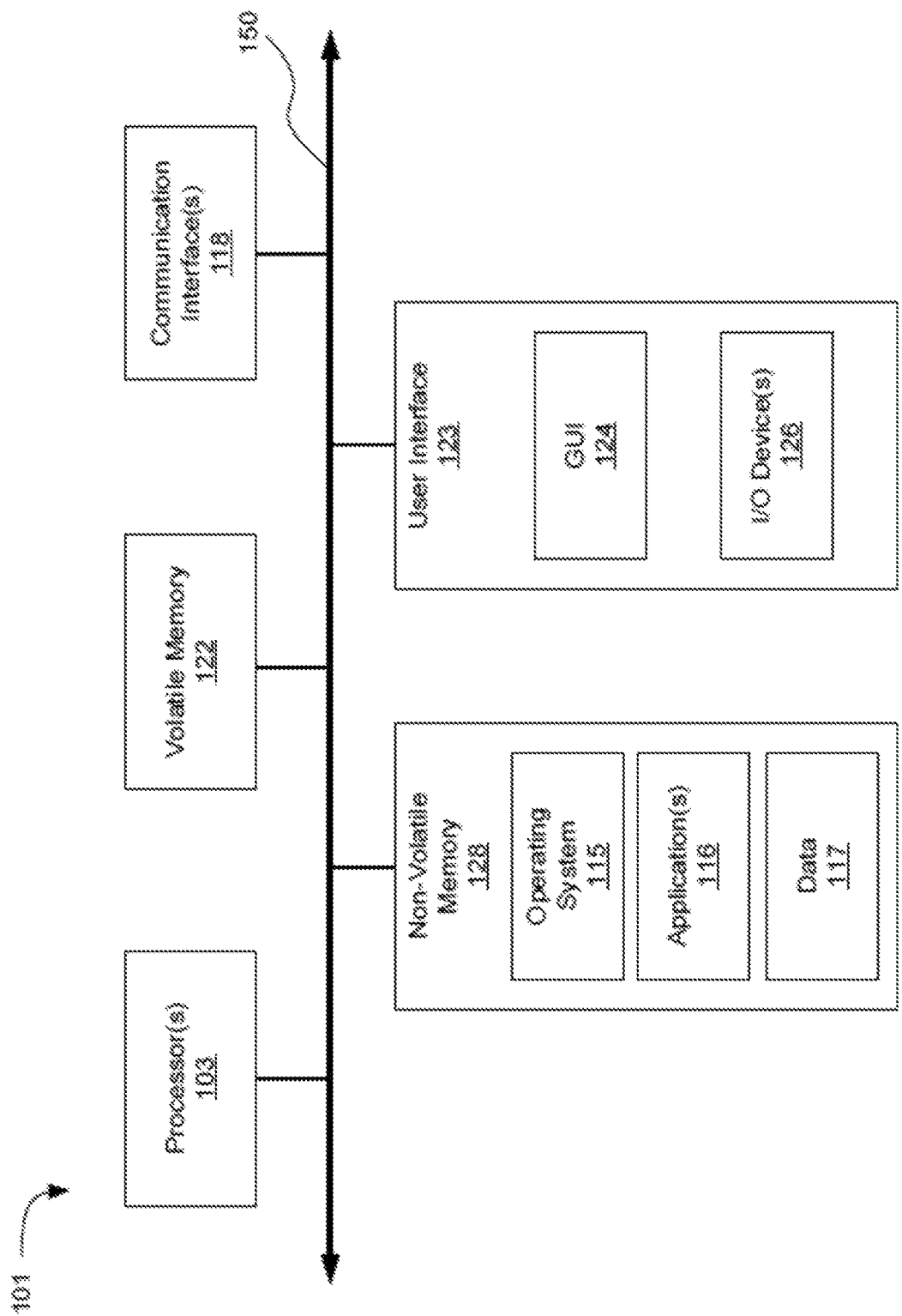
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein.

Section B describes systems and methods for monitoring security of an organization.

A. Computing Environment

Prior to discussing the specifics of embodiments of the systems and methods detailed herein in Section B, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for Monitoring Security of an Organization Based on a Normalized Risk Score The present disclosure is directed towards systems and methods for monitoring risk or security of an organization. An organization can be a company, enterprise and/or institution with a number of members, employees and/or persons having specific roles. The risk or security of an organization can be based on a normalized risk score determined for each of a plurality of network entities of the organization. The network entity, as used herein, can be referred to as a device, an application, and/or a user in the organization's network. A risk score is generally referred to as a level of risk imposed by a network entity to an organization (e.g., to an organization's network, system, security, entities, and so on). The disclosed systems and methods can measure risk in the context of user and entity behavior analytics (UEBA).

In a UEBA context, the risk score of a network entity is generally defined as an extent to which the network entity's behavior, activity, state and/or action deviates from the network entity's normal behavior, activity, state and/or action (hereafter sometimes generally referred as behavior or activity). To provide a baseline for defining this normal behavior across various products, applications, data sources, etc., a system (e.g., a server of an organization) can analyze or otherwise evaluate a number of indicators (sometimes referred to herein as risk indicators), each of which represents an anomaly in activity of a network entity. For example, each of the following behaviors, activities, states, and/or actions can be associated with a risk indicator: a certain number of login failures from a user (which could be associated with an identity of the user being stolen), one or more files being downloaded from an unusual network or physical location (which could be associated with data exfiltration), and an unusual access to a certain application (which could be associated with a violation of an enterprise policy). The indicators can be generated based on pre-configured statistical data, machine learning techniques, and/or rule based techniques. Once each indicator is identified and quantified, the system can aggregate such indicators to create a collective risk score for the network entity. Aggregating the indicators can be challenging, for instance due to heterogeneity of the indicators, their respective different importance factors, their respective occurrence frequencies, their respective time durations of livelihood, a non-standardized or unbounded (e.g., non-normalized) collective risk score, etc. For example, the login failure (or other activity) of a user in isolation may not always be associated with an anomalous activity. However, such an activity in combination with other events can be related to an anomalous activity, which can imply or constitute a larger risk or threat to the organization. For example, an unusual login followed by an unusual file access followed by an unusual upload to an external location can be more indicative of a data exfiltration attempt compared to any of the mentioned behaviors in isolation. Underestimating a risk score can put an organization at risk, and allowing too many false positives can waste the organization's time and resources to address. Due to these complexities and challenges, there is a challenge in achieving a standardized approach for calculating a network entity's risk score.

For example, some techniques may be used in the UEBA context to estimate the risk score of a network entity. However, such techniques may not consider each and every one of the above-identified complexities or challenges. For example, one technique may generate a risk score by increasingly accumulating a plurality of risk indicators that are identified based on one or more predefined activities, which can cause the risk score to become increasingly large in value, and/or lack the consideration of some dynamic activities (e.g., actual occurrence frequency and/or time duration of such activities). Thus, such techniques are not entirely satisfactory in every aspect.

In some embodiments, the disclosed systems and methods can periodically generate normalized risk scores for a network entity based on various behaviors of the network entity such as, for example, to what extent the network entity's behavior(s) deviate from the network entity's normal patterns of behavior or activity. In some embodiments, the disclosed systems and methods can generate a normalized risk score (or profile-adjusted risk score) for a network entity by collecting one or more measures (e.g., scores or risk values) of the network entity's accumulating, or accumulated risky behavior(s), amplifying and/or dampening the one or more measures based on frequency and timeline of the risky behavior(s), and normalizing the one or more measures.

In today's organizations, it can be challenging to automatically detect and further quantify a network entity's risky behavior to the organization. A network entity can represent either a single or a logical or physical group of devices, applications and/or users of an organization. For example, a network entity can correspond to a software program, which can be infected by a virus or malware. A network entity can include a device with a corrupted operating system or software program for instance. A network entity can be an employee of the organization, who can attempt to delete, transfer or misuse data. A network entity can include a team of developers that can attempt to use an unsanctioned software in the organization's network. A sudden surge in a network entity's risk (e.g., risk score) resulting from a network entity's behavior can constitute a compromised situation for the organization. Identifying such risky behaviors can allow an administrator or security professional of the organization to focus on the risky network entities (that perform and/or initiate the risky behaviors) and take actions accordingly to protect the organization against any potential risk or damage.

To address such a challenge, the disclosed systems and methods provide an extensible, systematic technical solution to quantify risk from a network entity of an organization in a normalized way, e.g., as a normalized risk score, which allows the risk to be quickly and accurately identified and addressed. For example, the technical solution can integrate any number of activities of a network entity that may be identified as risk to an organization, to generate, determine or calculate a risk score for the network entity. The technical solution can include one or more temporal characteristics of each of the activities (e.g., whether an activity becomes more or less risky to the organization) while generating the risk score. The technical solution can normalize or adjust the generated risk score, which allows a user or administrator to easily differentiate one risk score from another risk score so as to quickly address the riskier activities. Normalizing the generated risk score can also avoid a risk score from becoming arbitrarily large, while allowing the generated risk score to include any potential risky activity.

Figure 2:
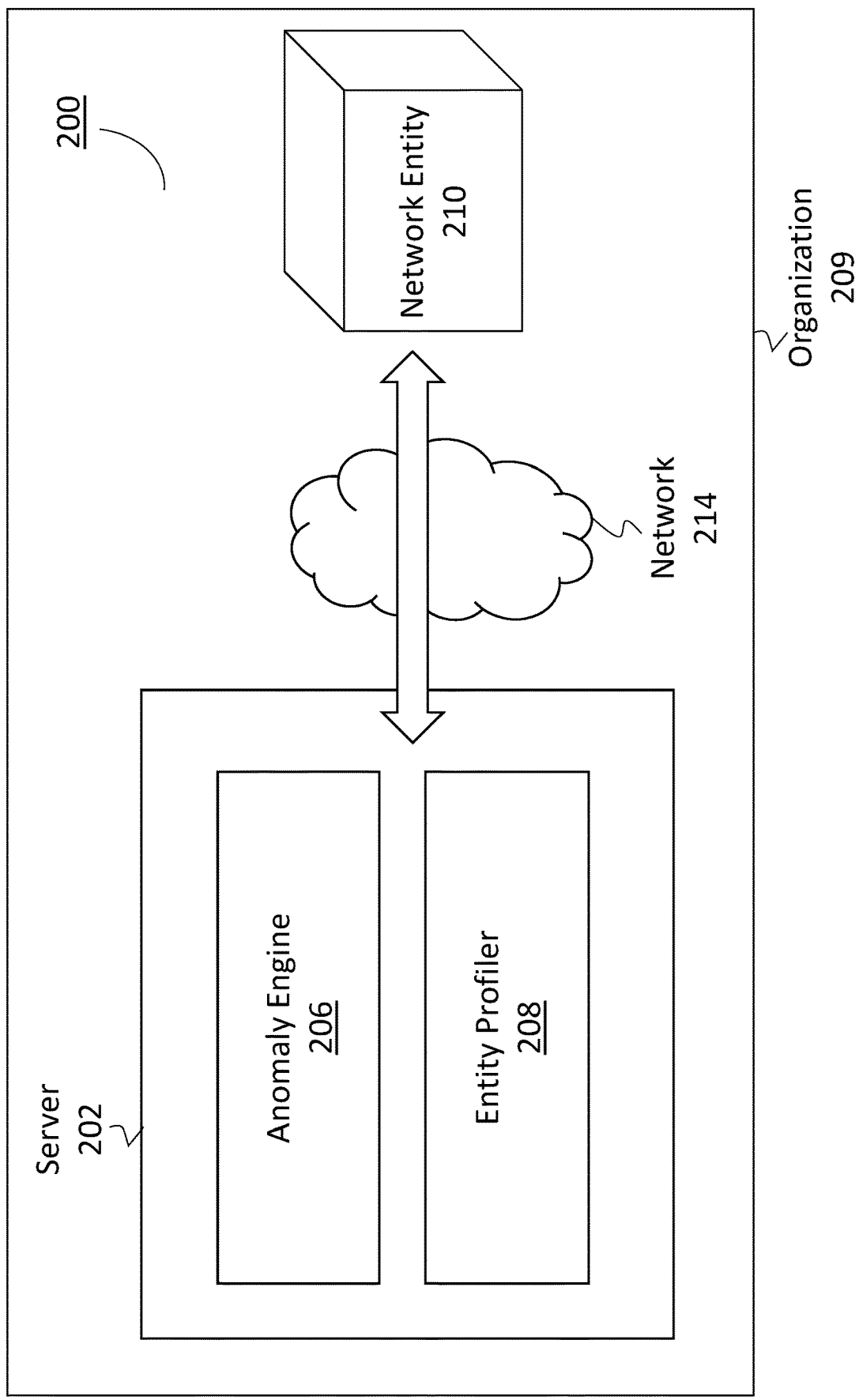
FIG. 2 is an example embodiment of a system for monitoring security of an organization.

Referring to FIG. 2, depicted is a block diagram of one example embodiment of a system 200 for monitoring security of an organization. The system 200 can include a server 202 that includes an anomaly engine 206 and/or an entity profiler 208. The system 200 can be used to monitor activities or behaviors of a network entity 210 (e.g., within and/or through a network 214 of an organization 209). In some embodiments, the server 202 and the network entity 210, may belong to or be associated with an organization, company or enterprise 209 (sometimes generally referred to as an organization). In certain embodiments, the server 202 may be operated by a service, entity or provider separate from or outside the organization 209. The network entity 210 can include a device, an application, and/or a user in the network 214 of the organization 209. The activity or behavior of the network entity 210 can be monitored, tracked, accessed or otherwise communicated via a network 214 (e.g., from a device or software application associated with the network entity 210, to the server 202). Although one network entity 210 is shown in the illustrated embodiment of FIG. 2, it is noted that the system 200 can include any number of network entities, each of which can communicate, interface with, or otherwise interact with the server 202 via the network 214 and/or with another network entity, while remaining within the scope of the present disclosure. Similarly, although one server 202 is shown in FIG. 2, the system 200 can include any number of servers 202, each of which can communicate, interface with, or otherwise interact with devices or software applications associated with respective network entities via the network 214, while remaining within the scope of the present disclosure.

Each of the above-mentioned elements or components is implemented in hardware, or a combination of hardware and software, in one or more embodiments. Each component of the system 200 may be implemented using hardware or a combination of hardware or software detailed above in connection with FIG. 1. For instance, each of these elements or components can include any application, program, library, script, task, service, process or any type and form of executable instructions executing on hardware of a client device (e.g., server 202). The hardware includes circuitry such as one or more processors in one or more embodiments.

The network 214 can include one or more components or functionalities of a transport network or a public network, or some other network or Internet communications channel. For example, the transport network and/or public network can each use one or more transport protocols and can be a wired network, wireless network, cloud network, local area network, metropolitan area network, wide area network, public network, private network, and the like. In some embodiments, the network 214 can reside (e.g., an internal network or intranet) within the organization 209. In cases where the server 202 is not part of the organization 209, information about the network entity 210 (e.g., within the organization 209) can be communicated via a secure network connection (e.g., secure socket layer (SSL) of a virtual private network (VPN)) to the server 202.

The server 202 can include a device and/or computer program that provides functionality for other devices or programs (e.g., network entity 210) of the organization 209 via the network 214. The server 202 can provide or include a cloud service, and can include at least one network device (e.g., of the network 214 or other network). A network device can be any type of computing device or node that is communicatively connected to another computing device or node of a network. The server 202 can include one or more elements of a computing device described above in connection with at least FIG. 1 for instance.

In some embodiments, the server 202 can be designed or implemented to detect, identify, monitor, track, measure and/or determine a plurality of risk indicators of a network entity 210. The server 202 may communicate with one or more monitoring agents (not shown) and/or may access one or more log files (e.g., with the network entity's operational and/or status information) in real time for instance, to perform the detection over the network 214. Each of the risk indicators can include an indication of one of a plurality of activities of the network entity 210, wherein each of the plurality of activities can potentially represent a behavior with some level of risk to the organization 209 that is performed by the network entity 210. For example, the network entity 210, which may be a client or mobile device managed by the organization 209, that may be used to access the enterprise application using invalid authentication credentials. The server 202 may detect this attempt to access the enterprise application as a failed login, which can be identified as a risk indicator.

In some embodiments, risk indicators (RIs) are units of threat or risk, and can be at the lowest level of a risk hierarchy. A risk hierarchy can include various levels indicative of risks in an organization, wherein higher levels can be represented by for instance department level risks, organization-wide risks, etc. In some embodiments, the risk indicators can be static, where one or more criteria/conditions of a predefined rule can be matched to behavior or activities of the network entity 210. A rule can be defined or specified by an administration for instance, to indicate one or more conditions or criteria that are associated with risk in a behavior or activity. The risk indicators can be behavioral, where a trend is detected to deviate from a normal or expected behavioral profile or trend of the network entity 210, by a certain amount or level for instance. For example, an unusual login followed by an unusual file access and then an unusual upload to an external location can be indicative of a data exfiltration attempt. Each risk indicator can be addressed as a uni-variate or multi-variate problem, be normalized based on peer group analysis, be decayed over time at a predefined or known pace, be amplified depending on the risk indicator's frequency, etc. Decaying a risk indicator over time can help address a benign unusual behavior that could be initially considered (to present a risk) but would be slowly decayed out of the system. For example, a benign but unusual activity, which may be initially identified with a risk indicator, may no longer occur or have impact as time passes. As such, the risk indicator may be decayed (e.g., exponentially or otherwise) over time. In the case of a rule-based approach, each risk indicator may be associated with either a value of 0 or 1 (or false or true, or some other values) for example. In the case of a behavioral approach, each risk indicator may be associated with a value ranging from 0 to 1 (or 0 to 100, or some other range) for instance.

The anomaly engine 206 of the server 202 can be designed or implemented to calculate, establish, update, determine, or otherwise generate a risk score of the network entity. The anomaly engine 206 can generate a risk score of the network entity by combining, including or summing a risk value of each of the plurality of risk indicators ("RiskValue$_{ri}$"), an amplification factor of each of the plurality of risk indicators ("Amplification$_{ri}$") and/or a dampening factor of each of the plurality of risk indicators ("Dampening$_{ri}$"). The anomaly engine 206 can generate the risk score by adding, incorporating or introducing an adjustment value for the plurality of risk indicators. In some embodiments, the adjustment value can include an amplification value for the plurality of risk indicators as a collective ("Amplification$_{RiskScore}$") and/or a dampening value for the plurality of risk indicators as a collective ("Dampening$_{RiskScore}$"). Each of the values/factors, as mentioned above, shall be discussed in further detail below. In some embodiments, the anomaly engine 206 can generate the Risk Score (e.g., by the above-mentioned technique) periodically (e.g., every predefined period of time) and/or in response to one or more detected risk indicators (e.g., in response to a number of the detected risk indicators reaching a predefined threshold).

In some embodiments, the anomaly engine 206 can generate the risk score of the network entity 210 based on the following equation:

$$RiskScore = \sum_{ri \in RI} \frac{(RiskValue_{ri} + Amplification_{ri} + Dampening_{ri}) +}{Cost_{ri}} \qquad (1)$$
$$\sum_{all\ factors} Amplification_{RiskScore} + \sum_{all\ factors} Dampening_{RiskScore}$$

wherein RiskValue$_{ri}$, Amplification$_{ri}$, Dampening$_{ri}$, Cost$_{ri}$, Amplification$_{RiskScore}$, Dampening$_{RiskScore}$ of the Risk Score equation can respectively be defined as follows.

RiskValue$_{ri}$: The contribution of one of the risk indicators ri to the overall Risk Score;

Amplification$_{ri}$: The respective amplification factor of one of the risk indicators ri that contributes to the overall Risk Score;

Dampening$_{ri}$: The respective dampening factor of one of the risk indicators ri that contributes to the overall Risk Score;

Cost$_{ri}$: The total contribution of one of the risk indicators ri to the overall Risk Score, which can include any extra component and/or exclude a subset of previously included components;

Amplification$_{RiskScore}$: The amplification value (or adjustment value) for the risk indicators, as a collective, that contributes to the overall Risk Score; and Dampening$_{RiskScore}$: The dampening value (or adjustment value) for the risk indicators, as a collective, that contributes to the overall Risk Score.

In some embodiments, the components or terms of equation (1), e.g., RiskValue$_{ri}$, Amplification$_{ri}$, and/or Dampening$_{ri}$, can be re-organized and/or reformulated, which allows some of the existing components to be removed or updated, and/or some extra components to be added. For example, a risk score may be calculated based on the terms RiskValue$_{ri}$ and Amplification$_{ri}$, another risk score may be calculated based on the terms RiskValue$_{ri}$ and Dampening$_{ri}$, and yet another risk score may be calculated based on the terms RiskValue$_{ri}$. As shall be discussed below, the characteristics of each risk indicator may vary over time. Allowing the components or terms of equation (1) to be updated can cause the disclosed systems and methods to calculate the risk score more flexibly, which in turn can allow the system to dynamically monitor a presence of a risky activity or behavior to an organization in an improved manner.

The calculations of RiskValue$_{ri}$, Amplification$_{ri}$, and Dampening$_{ri}$ are respectively discussed in further detail as follows.

In some embodiments, the anomaly engine 206 can calculate RiskValue$_{ri}$ over a certain period of time T, which is sometimes referred to as "a monitoring period T," and can refer to a period of time for monitoring a presence of a risky activity or behavior to an organization. The anomaly engine 206 can calculate RiskValue$_{ri}$ based on the following equation, for example:

$$\text{RiskValue}_{(ri)T} = P_{(ri)T} \times I_{ri} \times W_{ri} \quad (2)$$

wherein $P_{(ri)T}$, $I_{ri}$, and $W_{ri}$ of equation (2) can respectively be defined as follows:

$P_{ri_T}$: Probability of occurrence of one of the risk indicators ri during the period T;

$I_{ri}$: A risk impact of one of the risk indicators ri, which may be based on the priority (e.g., relative urgency and/or importance, or right to take precedence) of the risk indicator to an organization and can be statically and/or statistically defined; and $W_{ri}$: A weight of a risk category corresponding to one of the risk indicators ri, which may be statically and/or statistically defined. The weight of a risk category can be based on relevance, importance and/or preference for example. In some embodiments, the priority of one of the risk indicators, upon which $I_{ri}$ is based, may be defined or specified independently from $W_{ri}$.

The impact of a detected risk indicator may not be limited to a single monitoring period. For example, when an attacker can perform multiple actions associated with a threat vector over a relatively long period (e.g., a number of monitoring periods), one or more risk indicators associated with the threat vector shall be monitored over the relatively longer period of time, to monitor the collective behavior. As mentioned above, when calculating a risk score of a network entity, one of the risk indicators that affect the risk score may decay or disappear (e.g., in importance, relevance, and so on) over time. The risk from a risk indicator can be monitored for a longer period of time, and can be gradually excluded from consideration over time. As such, the cost of each detected risk indicator can be dampened in future monitoring periods. For example, although a risk indictor is detected during a current monitoring period T, such a risk indicator may not be detected during one or more of the prior and/or subsequent monitoring periods. Such a situation may occur when a user accesses an organization's network from an unusual location due to a personal trip, which may be initially identified with a risk indicator but may not frequently occur afterwards. In this regard, the anomaly engine 206 may take this into account via the respective dampening factors Dampening$_{(ri)}$ of the risk indicators when calculating the risk score over multiple monitoring periods for instance.

To address this, the present systems and methods can specify and/or use a decay factor for the probability of each risk indicator and can simply reduce this probability over time. Dampening could happen due to different reasons such as time elapsed, administrative input, etc. In some embodiments, the anomaly engine 206 can calculate Dampening$_{(ri)T}$ or based on time, e.g., over the monitoring period Tin which the risk indicator was present. The anomaly engine 206 can calculate Dampening$_{(ri)T}$ based on the following equation:

$$\text{Dampening}_{(ri)T} = DF_{(ri)T} \times P_{(ri)T-1} \times I_{ri} \times W_{ri} \quad (3)$$

wherein Dampening$_{(ri)T}$, $DF_{(ri)T}$, and $P_{(ri)T-1}$ of the dampening factor equation are respectively defined as follows:

Dampering$_{(i)T}$: The dampening factor of one of the risk indicators ri during monitoring period T;

$DF_{(ri)T}$: The decay factor of one of the risk indicators ri, namely what probability is being carried over from the past. This decay factor may be configurable between the values of 0 and 1 for example, or some other range (e.g., 0 to 100) or values. The dampening factor can gradually reach zero over time (e.g., an exponential decay), and be excluded from the total risk score. $P_{(ri)T-1}$: Probability of one of the risk indicators ri during monitoring period T-1.

There are scenarios under which the cost of a risk indicator can go beyond its simple risk value. One case is when a risk indicator has more importance when the risk indicator has multiple occurrences within the same monitoring period. As such, when calculating a risk score of a network entity, it should be noted when one of the risk indicators that constitute the risk score occurs multiple times during a monitoring period. For example, the occurrence of multiple low-probability login failures within a same monitoring period can be more severe than a one time high-probability login failure during the same monitoring period. Another case is when a risk indicator is associated with one or more sensitive, important assets to an organization. For example, an intention, attempt or action to access more sensitive documents from an unauthorized user can be more severe than an intention, attempt or action to access less sensitive documents from an authorized user. To capture this effect or contribution, an amplifying factor or component can be added to the risk value of a risk indicator for such cases. In this regard, the anomaly engine 206 may take into account the respective amplification factors Amplification$_{ri}$ of the risk indicators contributing to a risk score when calculating the risk score.

In some embodiments, the anomaly engine 206 can calculate an Amplification$_{(ri)T}$ factor or cost over the monitoring period T based on the following example equation:

$$p_{ri} = 1 \prod_{j=2}^{n_{ri}} (1 - P_{ri_j}) \quad (4)$$

$$\text{Amplification}_{(ri)T} = p_{(ri)T} \times I_{ri} \times W_{ri}$$

wherein $n_{ri}$ is the frequency of one of the risk indicators ri within the monitoring period T, and $p_{ri_j}$ is the probability of each occurrence j of that risk indicator ri.

The components specified above can contribute to the cost associated with each risk indicator. Such costs can be computed for each risk indicator, and can in some embodiments form a main component of the overall risk score. In addition to the cost components due to the individual risk indicators, the overall risk score can be impacted (e.g., amplified and/or dampened) by various factors such as being part of threat vectors, entity history, etc. Such factors can be represented in Amplification$_{RiskScore}$, which can be an amplification value for the risk indicators, as a collective (or as a whole or group), that contributes to the overall risk score, and/or Dampening$_{RiskScore}$, which can be the dampening value for the risk indicators, as a collective (or as a whole or group), that contributes to the overall risk score. For example, an unusual access to an organization's device followed by a large number file downloads, each of which is associated with a respective risk indicator, may contribute to an amplification value for the risk indicators.

One goal of a risk scoring system is to identify the level of risk (e.g., risk score) that is imposed by a network entity. It can be helpful to have a scale against which the risk score can be evaluated and interpreted. Simply adding the risk values of all risk indicators could make the risk score arbitrarily large, which can make it difficult to interpret the overall risk. One approach is to normalize the score between 0 and 100. This is not easily achieved as the maximum value of risk score can be fluid and can depend on the number and/or cost of the risk indicators.

Referring again to FIG. 2, the anomaly engine 206 can generate or determine a normalized risk score of the network entity 210 using the generated risk score and one or more pre-defined thresholds. Upon generating a risk score, the anomaly engine 206 may compare the generated risk score to a pre-defined threshold (e.g., a normalized risk score of 100 that indicates the highest risk) to determine whether the generated risk score is greater or less than the pre-defined threshold. In response to determining that the generated risk score is greater than the pre-defined threshold, the anomaly engine 206 may adjust the generated risk score by adjusting the generated risk score according to the pre-defined threshold. In some embodiments, the anomaly engine 206 may proportionally adjust the component(s) or term(s) of the generated risk score (e.g., $RiskValue_{ri}$, $Amplification_{ri}$, $Dampening_{ri}$, $Amplification_{RiskScore}$, and/or $Dampening_{RiskScore}$ of equation 1) according to the pre-defined threshold to determine a normalized risk score.

In an example where the pre-defined threshold is 100, in response to the anomaly engine 206 determining that a generated risk score is greater than 100 (e.g., 120), the anomaly engine 206 may determine a normalized risk score to be 100 by adjusting or scaling 120 to become 100, or multiplying or scaling 120 by a ratio determined according to the generated risk score and the pre-defined threshold (e.g., 100/120=0.83). While multiplying or scaling the generated risk score by the ratio to determine the normalized risk score, the anomaly engine 206 may proportionally multiply one or more of the terms that constitute the generated risk score by the ratio.

Continuing with the above example, in response to determining that a generated risk score (e.g., the highest risk score out of a plurality of risk scores) is less than 100 (e.g., 80), the anomaly engine 206 may determine a normalized risk score to be 100 by adjusting or scaling 80 to become 100, or multiplying or scaling 80 by a ratio determined according to the generated risk score and the pre-defined threshold (e.g., 100/80=1.25). While multiplying the generated risk score by the ratio to determine the normalized risk score, the anomaly engine 206 may proportionally multiply or scale one or more of the terms that constitute the generated risk score by the ratio.

In some other embodiments, the anomaly engine 206 can generate or determine a profile-adjusted risk score of the network entity 210 using the generated risk score and a profile of the network entity, which shall be described below. The profile-adjusted risk score may be referred to as another embodiment of the normalized risk score. In some embodiments, the anomaly engine 206 can generate, determine or calculate a plurality of risk scores (e.g., non-normalized risk scores) of a network entity 210 over a certain period of time, which is sometimes referred to as a training period. In response to generating the plurality of non-normalized risk scores, the anomaly engine 206 may provide such data to an entity profiler 208 for forming or establishing the above-mentioned profile of the network entity to determine a normalized risk score, which shall be discussed in further detail below.

In accordance with some embodiments, the anomaly engine 206 can initiate an action according to the normalized risk score. For example, the anomaly engine 206 may cause the server 202 to record, or store the normalized risk into a database, and/or cause the server 202 to initiate or trigger an alarm to notify an administrator of the organization in response to the normalized risk score exceeding a threshold. The threshold can be set or predefined to be 80 or 90 for example, for a normalized risk score range of 0 to 100, where 100 indicates the highest risk. In some embodiments, the threshold can be predefined or specified according to statistical or historical analysis of past risks and activities. In certain embodiments, the threshold can be adjusted according to the organization's policies, tolerances or goals.

An entity profiler 208 of the server 202 can be designed or implemented to receive a plurality of risk scores of the network entity 210 over a training period to form a profile (or risk profile) of the network entity 210 for the training period. The profile is to form a distribution of risk scores, which can be used to determine or estimate the probabilities of various risk scores obtained for the training period. In some embodiments, the entity profiler 208 may group, classify or categorize the plurality of risk scores into a number of risk score ranges, and can determine and record the respective number of occurrences of risk scores falling into each of the risk score ranges, to form the profile of the network entity 210. In some embodiments, the entity profiler 208 can generate a histogram or distribution chart based on the respective numbers of occurrences over a training period with respect to the risk score ranges. In some embodiments, the histogram can include a plurality of risk score ranges or bins, for accumulating or tracking the number (or estimated frequency) of risk scores that are within each of the ranges or bins. In some embodiments, the number of occurrence of a risk score (and/or risk scores within a same bin or range) over a training period may sometimes be referred to as an estimated frequency over the training period for that risk score. The entity profiler 208 can cause the histogram or distribution chart to be displayed via a Graphical User Interface (GUI), e.g., of the server 202, or remotely on a terminal of an administrator for instance. A probability of the risk score can refer to the number of occurrence (or estimated frequency) of the risk score (and/or other risk scores) within a same bin or range relative to (or divided by) occurrences of all risk scores within the training period for instance.

Figure 3:
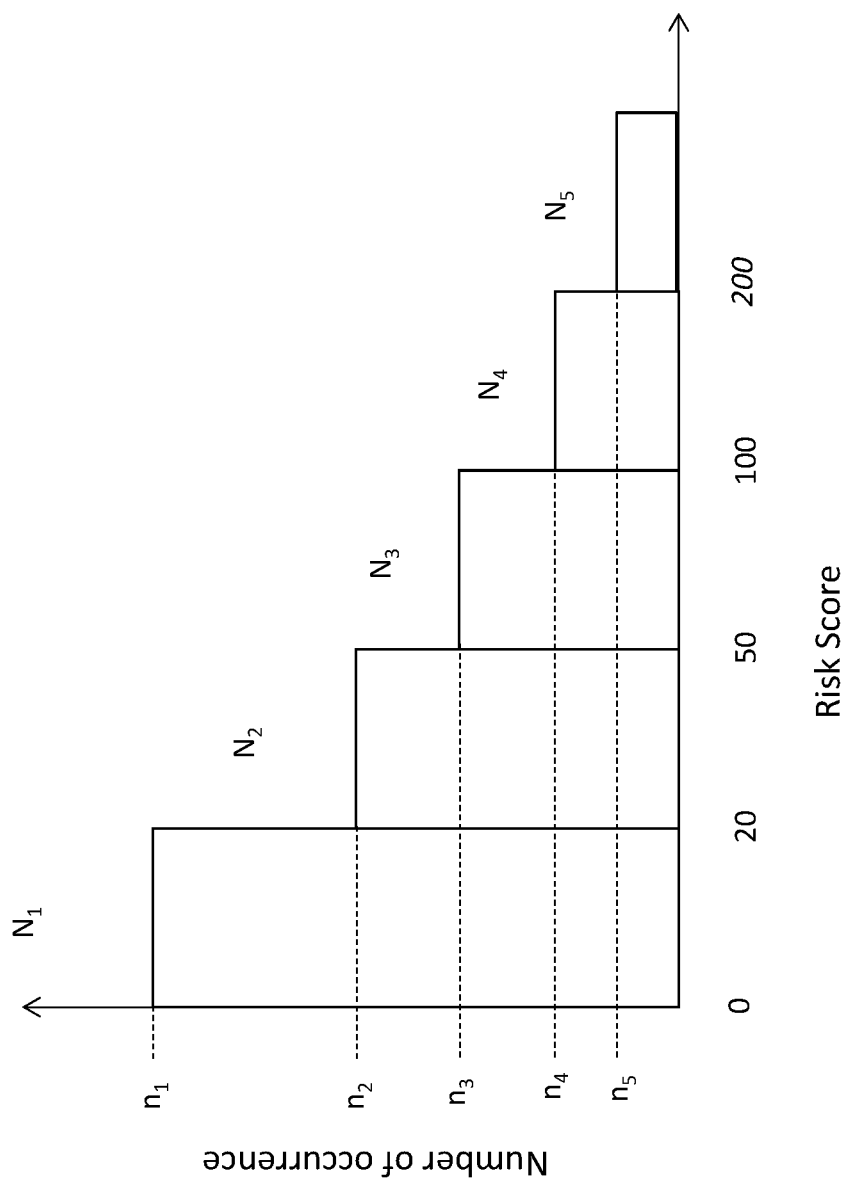
FIG. 3 is a histogram of an example profile of a network entity of an organization.

An example histogram, generated based on the respective numbers of occurrences of risk scores with respect to the risk score ranges, is illustrated in FIG. 3. As shown in the example of FIG. 3, the entity profiler 208 may receive a plurality of risk scores determined over a training period, from the anomaly engine 210. The risk scores may range from 0 to about 220, as an example. Upon reception, the entity profiler 208 may group or classify the plurality of risk scores into risk score ranges or buckets: $N_1$, $N_2$, $N_3$, $N_4$, and $N_5$. The entity profiler 208 may determine or record the respective numbers of occurrences of the risk score ranges $N_1$ to $N_5$ over the training period as $n_1$, $n_2$, $n_3$, $n_4$, and $n_5$.

The entity profiler 208 can be designed or implemented to determine a probability of each of the risk scores or risk score ranges over the training period. In some embodiments, the entity profiler 208 can determine a respective probability of each of the risk scores or risk score ranges using the above-described numbers of occurrences. Using the example histogram of FIG. 3, to determine the probability of a risk score (e.g., within the risk score range $N_3$), the entity profiler 208 can divide the number of occurrences of risk scores falling within the risk score range $N_3$, which is $n_3$, by a sum of the numbers of occurrences of the risk score ranges $N_1$ to $N_5$, which is $n_1+n_2+n_3+n_4+n_5$. The entity profiler 208 can determine a probability for each risk score in a similar fashion.

The anomaly engine 206 can determine a probability of the network entity having a particular calculated risk score (e.g., a risk score calculated by the anomaly engine 206 according to the risk indicators of the network entity). Using the probabilities of the risk scores or risk score ranges determined over the training period for instance, the anomaly engine 206 can determine or identify a probability corresponding to the calculated risk score (e.g., by selecting the probability that corresponds to a risk score obtained for the training period that matches the calculated risk score, or to a risk score range that spans over the value of the calculated risk score). For instance, the anomaly engine 206 may communicate with the entity profiler 208 to obtain or access a profile of the network entity 210 (e.g., a histogram of risk scores, or a probability profile (or probabilities) of the risk scores). The entity profiler 208 can determine or identify a probability of a risk score generated for a monitoring period, and can calculate a normalized risk score or profile-adjusted risk score for the risk score using the following equation, for example:

$$\text{Normalized Risk Score}_{entity} = (1 - P_{entity}) \times 100 \quad (5)$$

wherein $P_{entity}$ is the probability of the risk score of the network entity 210. By using the above-described technique to normalize or adjust the risk score of a network entity of an organization, the risk scores across multiple monitoring periods and/or across multiple entities of the organization may become comparable. Further, by using the above equation, each normalized risk score can be confined within the values of 0 to 100, thus limiting the normalized risk score to a maximum value of 100. The 0 to 100 range can be modified by updating the "100" factor in equation (5).

Figure 4:
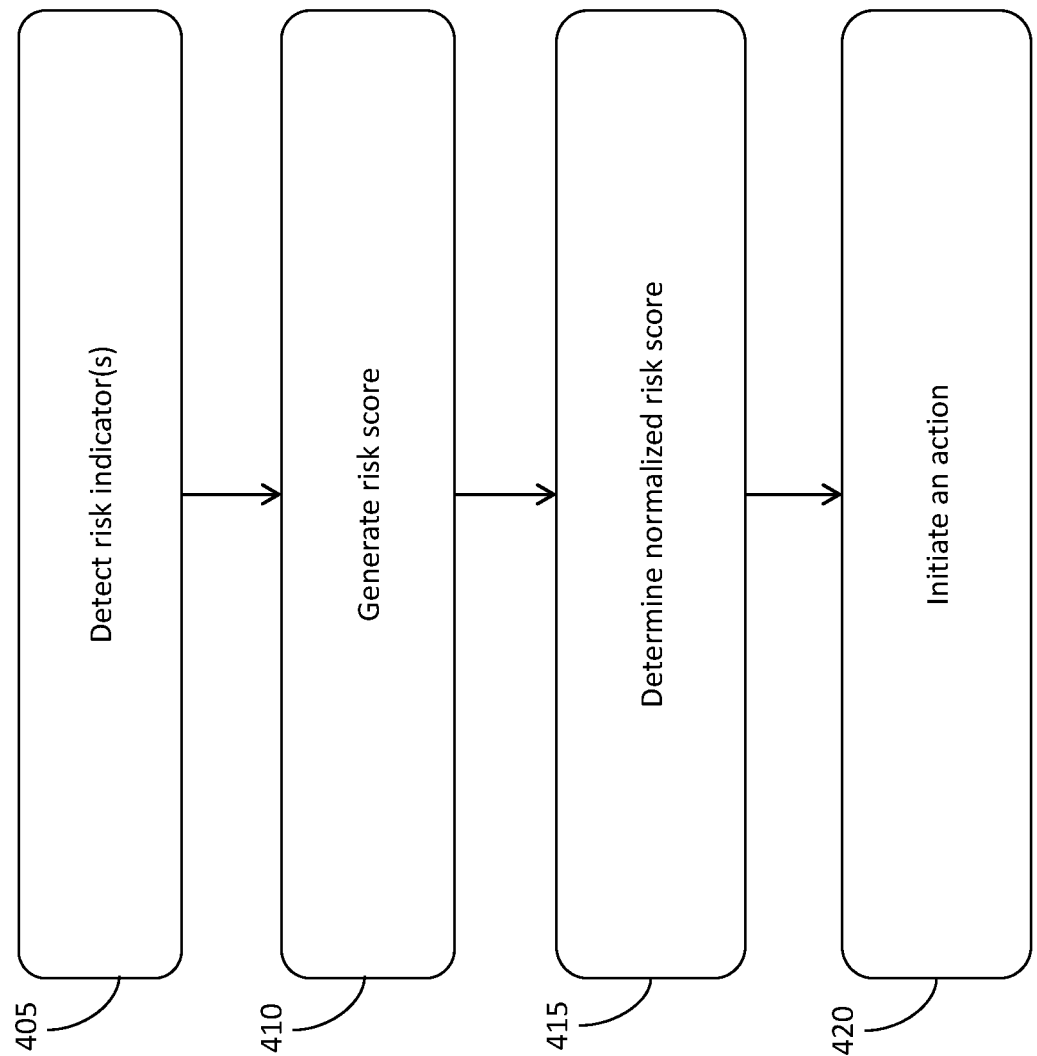
FIG. 4 is an example process flow for monitoring security of an organization.

Referring to FIG. 4, depicted is a flow diagram of one embodiment of a method 400 for monitoring security of an organization. The method 400 for monitoring the security of the organization can be based on a normalized risk score imposed by each of a plurality of entities of the organization. The functionalities of the method may be implemented using, or performed by, the components detailed herein in connection with FIGS. 1-3. In brief overview, a server can detect one or more risk indicators (405). The server can generate a risk score of a network entity (410). The server can determine a normalized risk score (415). The server can initiate an action (420).

Referring now to operation (405), and in some embodiments, a server (e.g., 202) can detect one or more risk indicators. The server can detect a plurality of risk indicators, each of which identifies one of a plurality of activities of a network entity (e.g., 210) of an organization (e.g., 209). In some embodiments, the server 202 may periodically detect risk indicators of a network entity. The server can for instance communicate with a monitoring agent via a network, or access a log file recording activities of a network entity, to identify or detect various activities of the network entity. The server can identify at least some of the activities as risk indicators of the network entity. The server can detect a plurality of risk indicators of the network entity for or over a monitoring period, e.g., by communicating with monitoring agent(s) executing on device(s) used or accessed by the network entity 210. Such monitoring devices can provide reports or updates to the server 202 periodically, when certain activities and/or conditions are detected, or according to a schedule.

Referring now to operation (410), and in some embodiments, an anomaly engine of the server can generate a risk score of a network entity, such as during a monitoring period. The server 202 can generate the risk score of the network entity 210, by combining a risk value, an amplification factor and a dampening factor of each of the plurality of risk indicators, and/or adding an adjustment value for the plurality of risk indicators as a collective. In some embodiments, the adjustment value for the plurality of risk indicators can include an amplification value for the plurality of risk indicators as a collective and/or a dampening value for the plurality of risk indicators as a collective. The risk value of each of the plurality of risk indicators, the amplification factor of each of the plurality of risk indicators, the dampening factor of each of the plurality of risk indicators, the amplification value for the plurality of risk indicators as a collective, and the dampening value for the plurality of risk indicators as a collective are described above, respectively, in connection with at least FIGS. 2-3.

In some embodiments, the anomaly engine 206 of the server 202 can generate a plurality of risk scores for the network entity 210 over a training period. In response to the generation of the plurality of risk scores of the network entity 210 over the training period, an entity profiler 208 of the server 202 may receive the plurality of risk scores of the entity 210 over the training period from the anomaly engine 206. Responsive to receiving the plurality of risk scores of the entity 210 over the training period, the entity profiler 208 of the server 202 may form, generate or establish a profile of the entity 210. The entity profiler 208 of the server 202 can establish the profile as described above in connection with at least FIGS. 2-3. The profile can include a histogram or frequency distribution of risk scores of the network entity in the training period. The profile can include a profile of probabilities of the network entity corresponding to the risk scores in the training period.

For example, the entity profiler 208 of the server 202 can determine a probability of each of the plurality of risk scores of the network entity 210 over the training period based on respective numbers of occurrences of the plurality of risk scores of the network entity 210 over the training period (e.g., respective frequencies over the training period), as illustrated above with respect to the example of FIG. 3. In some embodiments, upon determining the probability of each of the plurality of risk scores of the network entity 210 over the training period, the entity profiler 208 of the server 202 may establish the profile of the network entity 210 with the probabilities of the plurality of risk scores of the network entity 210 determined over the training period.

Referring now to operation (415), and in some embodiments, the anomaly engine 206 of server 202 can determine a normalized risk score of the network entity. In some embodiments, the normalized risk score may indicate potential risk from the network entity to the organization. For example, the server 202 can determine a normalized risk score using the generated risk score (e.g., at operation 410) and/or one or more pre-defined thresholds. In some embodiments, the server 202 can determine whether to adjust the generated risk score based on comparing the generated risk score with the pre-defined threshold. For example, in response to determining that the generated risk score is greater than a pre-defined threshold, the server 202 may scale down the generated risk score to substantially match the pre-defined threshold, and/or proportionally adjust each of the terms that constitute the generated risk score. In another example, in response to determining that the generated risk score is less than a pre-defined threshold, the server 202 may scale up the generated risk score to substantially match the pre-defined threshold, and/or proportionally adjust each of the terms that constitute the generated risk score.

In another example, the server 202 can generate a profile-adjusted risk score of the network entity as a normalized risk score of the network entity using the profile of the network entity 210. The server 202 (e.g., anomaly engine 206) can generate the profile-adjusted risk score of the monitoring period, using the profile established for the training period, and the risk score determined for the monitoring period. In some embodiments, the anomaly engine 206 of the server 202 may obtain or access the profile of the network entity 210 by identifying a probability P of one of the plurality of generated risk scores, e.g., by communicating with the entity profiler 208 to access or obtain the profile of the entity 210. Further, the anomaly engine 206 of the server 202 can determine the profile-adjusted risk score as (1−P)×100.

Referring now to operation (420), and in some embodiments, the anomaly engine 206 of the server 202 can initiate an action according to the profile-adjusted risk score or normalized risk score. In some embodiments, responsive to the normalized risk score reaching or exceeding a pre-defined threshold, the anomaly engine 206 or server 202 can take an action, notify an administrator of the organization 209, prevent an activity of the network entity, and/or provide a warning to the network entity. For example, the server 202 can shut down the entity (e.g., device or program), wipe the memory of the network entity (e.g., device) to prevent loss of data, lock an entity's (e.g., user's) credentials to prevent further risky behavior, and/or lock a user's credentials to prevent use of the network entity (e.g., device or program).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A computing device comprising:
a memory;
one or more processors operatively coupled to the memory, the one or more processors configured to:
detect a plurality of risk indicators, at least one of the risk indicators identifying one of a plurality of activities of a network entity of an organization, the network entity comprising a device, an application or a user in the organization's network;
generate an overall risk score of the network entity, by:
(a) generating respective risk scores, each respective risk score corresponding to a respective one of the plurality of risk indicators and generated according to: (i) a risk value of one or more of the activities of the network entity, (ii) an amplification factor and (iii) a dampening factor, of a respective one of the plurality of risk indicators,
(b) performing a summation of the respective risk scores; and
(c) adding an adjustment value to the summation of the respective risk scores;
determine, by scaling the overall risk score of the network entity with respect to a value, a normalized risk score of the network entity which indicates potential risk from the network entity to the organization; and
initiate an action according to the normalized risk score, to protect the organization from the potential risk indicated by the normalized risk score of the network entity.

2. The computing device of claim 1, wherein the one or more processors are configured to:
receive respective risk scores of the network entity over a training period, each respective risk score having an estimated frequency of occurrences of the respective risk score over the training period; and
determine a probability of occurrence of at least one of the respective risk scores over the training period according to the estimated frequency of each of the respective risk scores over the training period.

3. The computing device of claim 2, wherein the one or more processors are configured to:
identify a probability P of occurrence of the overall risk score, according to the probabilities determined over the training period; and
determine the normalized risk score as (1−P)×100.

4. The computing device of claim 1, wherein the adjustment value includes an amplification value for the plurality of risk indicators, and a dampening value for the plurality of risk indicators.

5. The computing device of claim 1, wherein the one or more processors are configured to:
determine whether the overall risk score is greater or less than a pre-defined threshold; and
based on the determination of whether the overall risk score is greater or less than a pre-defined threshold, adjust the overall risk score according to the pre-defined threshold to determine the normalized risk score of the network entity.

6. The computing device of claim 5, wherein the one or more processors are configured to:
proportionally adjust at least one of the risk value, the amplification factor or the dampening factor of each of the plurality of risk indicators, and the adjustment value for the plurality of risk indicators, according to the pre-defined threshold.

7. The computing device of claim 1, wherein the one or more processors are configured to:
determine the amplification factor of a first risk indicator of the plurality of risk indicators according to a frequency of the first risk indicator; and
determine the dampening factor of a second risk indicator of the plurality of risk indicators for a time period according to a probability of the second risk indicator in a previous time period.

8. A method comprising:
detecting, by a server, a plurality of risk indicators, at least one of the risk indicators identifying one of a plurality of activities of a network entity of an organization, the network entity comprising a device, an application or a user in the organization's network;
generating, by the server, an overall risk score of the network entity, by:
(a) generating respective risk scores, each respective risk score corresponding to a respective one of the plurality of risk indicators and generated according to: (i) a risk value of one or more of the activities of the network entity, (ii) an amplification factor and (iii) a dampening factor, of a respective one of the plurality of risk indicators,
(b) performing a summation of the respective risk scores; and
(c) adding an adjustment value to the summation of the respective risk scores;
determining, by the server by scaling the overall risk score of the network entity with respect to a value, a normalized risk score of the network entity which indicates potential risk from the network entity to the organization; and
initiating, by the server, an action according to the normalized risk score to protect the organization from the potential risk indicated by the normalized risk score of the network entity.

9. The method of claim 8, further comprising:
receiving, by the server, respective risk scores of the network entity over a training period, each respective risk score having an estimated frequency of occurrences of the respective risk score over the training period; and
determining, by the server, a probability of occurrence of at least one of the respective risk scores over the training period according to the estimated frequency of each of the respective risk scores over the training period.

10. The method of claim 9, further comprising:
identifying, by the server, a probability P of occurrence for the overall risk score, according to the probabilities determined over the training period; and
determining, by the server, the normalized risk score as $(1-P) \times 100$.

11. The method of claim 8, wherein the adjustment value includes an amplification value for the plurality of risk indicators, and a dampening value for the plurality of risk indicators.

12. The method of claim 8, further comprising:
determining whether the overall risk score is greater or less than a pre-defined threshold; and
based on the determination of whether the overall risk score is greater or less than a pre-defined threshold, adjusting the overall risk score according to the pre-defined threshold to determine the normalized risk score of the network entity.

13. The method of claim 12, further comprising:
proportionally adjusting at least one of the risk value, the amplification factor or the dampening factor of each of the plurality of risk indicators, and the adjustment value for the plurality of risk indicators, according to the pre-defined threshold.

14. A non-transitory computer readable medium storing program instructions for causing one or more processors to:
detect a plurality of risk indicators, at least one of the risk indicators identifying one of a plurality of activities of a network entity of an organization, the network entity comprising a device, an application or a user in the organization's network;
generate, an overall risk score of the network entity, by:
(a) generating respective risk scores, each respective risk score corresponding to a respective one of the plurality of risk indicators and generated according to: (i) a risk value of one or more of the activities of the network entity, (ii) an amplification factor and (iii) a dampening factor, of a respective one of the plurality of risk indicators,
(b) performing a summation of the respective risk scores; and
(c) adding an adjustment value to the summation of the respective risk scores;
determine, by scaling the overall risk score of the network entity with respect to a value, a normalized risk score of the network entity which indicates potential risk from the network entity to the organization; and
initiate an action according to the normalized risk score, to protect the organization from the potential risk indicated by the normalized risk score of the network entity.

15. The non-transitory computer readable medium of claim 14, wherein the program instructions further cause the one or more processors to:
receive respective risk scores of the network entity over a training period, each respective risk score having an estimated frequency of occurrences of the respective risk score over the training period; and
determine a probability of occurrence of at least one of the respective risk scores over the training period according to the estimated frequency of each of the risk scores over the training period.

16. The non-transitory computer readable medium of claim 15, wherein the program instructions further cause the one or more processors to:
identify a probability P of occurrence for the overall risk score, according to the probabilities determined over the training period; and
determine the normalized risk score as $(1-P) \times 100$.

17. The non-transitory computer readable medium of claim 14, wherein the adjustment value includes an amplification value for the plurality of risk indicators, and a dampening value for the plurality of risk indicators.

18. The non-transitory computer readable medium of claim 14, wherein the program instructions further cause the one or more processors to:
determine whether the overall risk score is greater or less than a pre-defined threshold; and
based on the determination of whether the overall risk score is greater or less than a pre-defined threshold, adjust the overall risk score according to the pre-defined threshold to determine the normalized risk score of the network entity.

19. The non-transitory computer readable medium of claim 18, wherein the program instructions further cause the one or more processors to:
  proportionally adjust at least one of the risk value, the amplification factor or the dampening factor of each of the plurality of risk indicators, and the adjustment value for the plurality of risk indicators, according to the pre-defined threshold.

20. The non-transitory computer readable medium of claim 14, wherein the program instructions further cause the one or more processors to:
  determine the amplification factor of a first risk indicator of the plurality of risk indicators according to a frequency of the first risk indicator; and
  determine the dampening factor of a second risk indicator of the plurality of risk indicators for a time period, according to a probability of the second risk indicator in a previous time period.

\* \* \* \* \*